June 29, 1948.  W. L. WEAKLEND  2,444,212
APPLICATOR
Filed Feb. 28, 1946  2 Sheets-Sheet 1
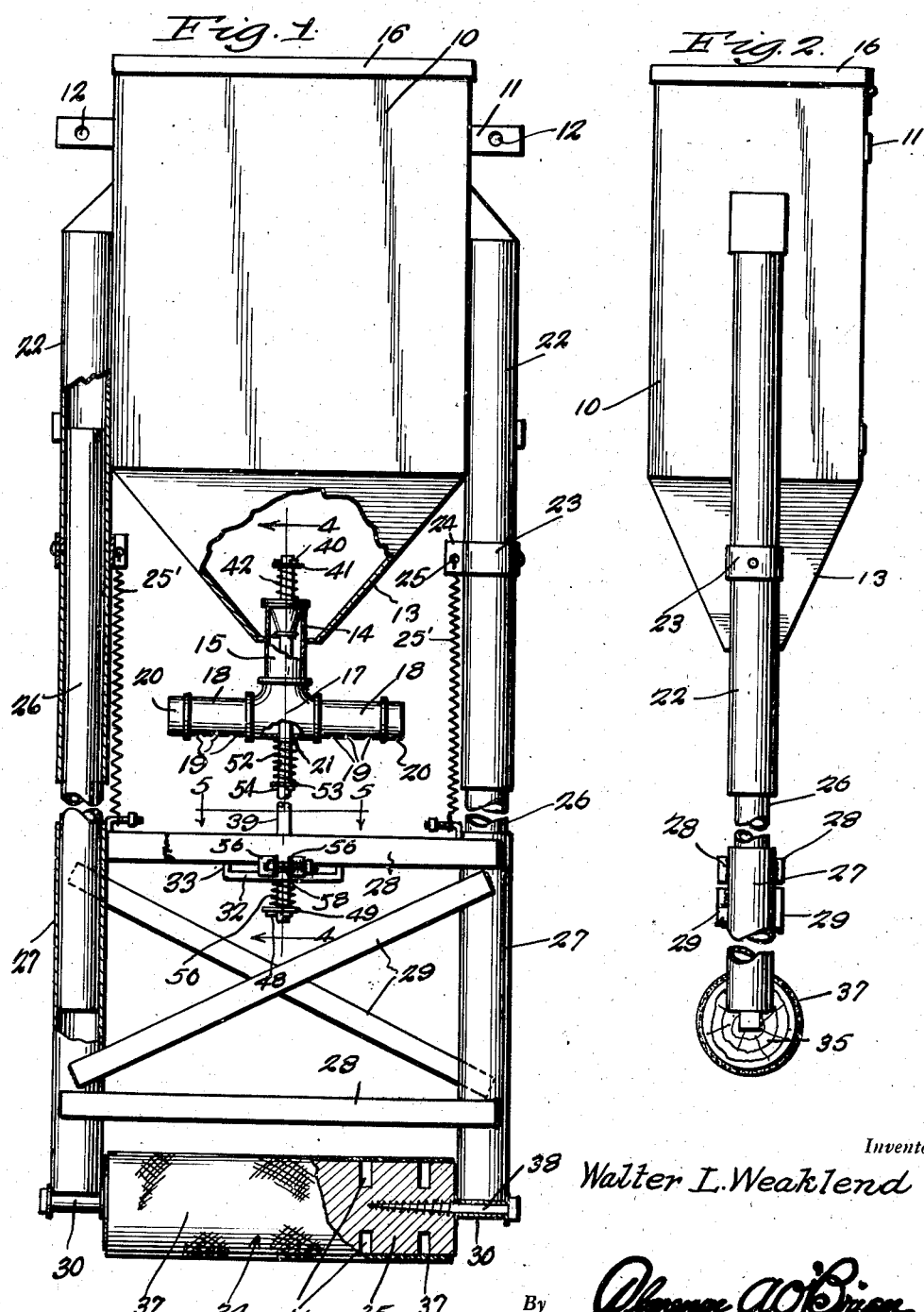
Inventor
Walter L. Weaklend June 29, 1948.   W. L. WEAKLEND   2,444,212
APPLICATOR
Filed Feb. 28, 1946   2 Sheets-Sheet 2
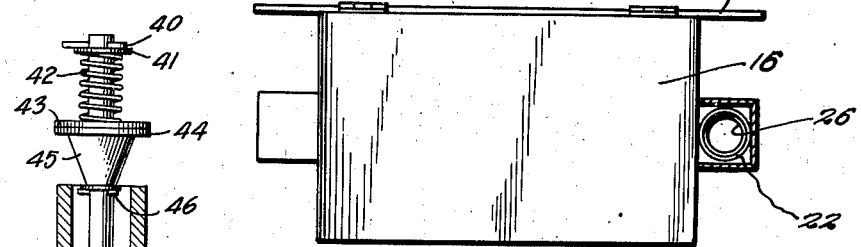
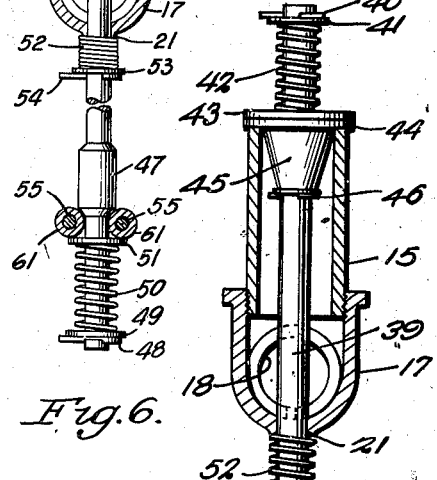
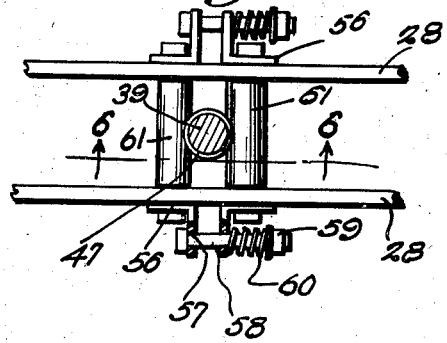
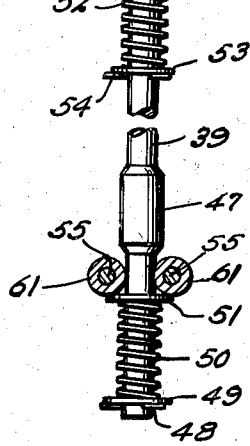
Inventor
Walter L. Weaklend
By *Clarence A. O'Brien
and Harvey B. Jacobson*
Attorneys Patented June 29, 1948

2,444,212

UNITED STATES PATENT OFFICE 2,444,212

APPLICATOR

Walter L. Weaklend, Rosendale, Mo.

Application February 28, 1946, Serial No. 650,974

2 Claims. (Cl. 119—157)

This invention relates to an applicator and more particularly to a device for applying liquid chemicals to animals.

The primary object of the invention is to uniformly apply a liquid such as oil to the back of an animal as it passes beneath the applicator.

Another object is to apply the liquid uniformly to animals of varying heights.

The above and other objects may be attained by employing this invention which embodies a tank suspended in spaced relation to the ground carrying guides, a liquid discharge valve in the bottom of the tank, spray pipes connected to the liquid discharge valve, a rotary applicatory suspended from the tank for vertical movement with relation thereto and having liquid retaining recesses in its periphery, a liquid absorbing and distributing covering on said rotary applicator and means operable upon upward movement of the applicator for opening the liquid discharge valve and spraying the applicator with liquid through the spray pipe.

Other features include means for initially opening the valve to allow the liquid to be discharged upon the applicator, which means permits the valve to close after the initial discharge of the liquid has taken place, despite the fact that an animal may linger beneath the device and hold the applicator elevated.

In the drawings:

Figure 1 is a side view partially in section of a liquid applicator embodying the features of this invention, Figure 2 is an end view in elevation of Figure 1, Figure 3 is a top plan view of Figure 1, Figure 4 is a vertical sectional view taken substantially along the line 4—4 of Figure 1, Figure 5 is a transverse sectional view taken substantially alone the line 5—5 of Figure 1, and Figure 6 is a view similar to Figure 4 showing the parts in valve opening position.

Referring to the drawings in detail a liquid containing tank 10 is provided with a suitable bracket 11, opposite ends of which project beyond the sides of the tank or reservoir 10 and are pierced as at 12 to receive supporting screws by which the tank may be suspended from a fixed support (not shown). This tank 10 is provided with a pyramidal bottom 13 having an axial opening 14 into which a pipe nipple 15 is welded or otherwise secured to form a liquidtight junction. A cover 16 is fitted on the tank 10 and as shown the nipple 15 extends upwardly into the tank for a short distance to form a valve seat. Attached to the end of the nipple opposite that which enters the tank 10 is a T 17 to opposite legs of which are connected nipples 18 having perforations 19 through which liquid from the tank is discharged onto the applicator to be more fully hereinafter described. The ends of the nipples 18 opposite those entering the T 17 are closed by caps 20 as will be readily understood upon reference to Figure 1. The T 17 is provided with an opening 21 which aligns axially with the nipple 15 for the reception of the valve rod to be more fully hereinafter described. Attached to opposite side walls of the tank or reservoir 10 are tubular sleeves 22, the lower ends of which project below the bottom sides of the spray pipes 18 and attached to the tubular guides or sleeves 22 are bands 23 provided with inwardly extending ears 24 which are pierced as at 25 for a purpose to be more fully hereinafter explained.

Mounted for sliding movement in the tubular guides 22 are guide rods 26 the lower ends of which are welded or otherwise rigidly fixed within tubular sockets 27 which are joined near opposite ends by cross-members 28 to form a substantially rectangular frame. Cross-braces 29 extend diagonally between the opposite socket members 27 and secured to the extreme lower ends of the socket members are axially aligning sleeves 30 which form bearings for the trunnions of the applicator roller to be more fully hereinafter described. Secured to the bottom edge of each of the uppermost bars 28 are guide bars 32 the ends of which are upturned as at 33 and welded to the undersides of the bars 28 to form guide channels for the friction roller supporting brackets which will be more fully hereinafter described. Suspension springs 25' depend from the bands 23 and their lower ends are attached to the uppermost cross-bars 28 yieldingly to suspend the carriage for vertical movement with relation to the tank 10.

My improved rotary applicator, designated generally as 34, comprises a cylindrical body or roller 35 having formed therein spaced peripheral openings or recesses 36 forming reservoirs for the liquid to be dispensed. A fabric coating 37 encircles the cylindrical body 35 and serves to evenly spread the liquid applied thereto throughout the entire surface. Entering opposite ends of the body 35 are lag screws 38 which extend through the sleeves 30 in order to mount the applicator 34 for rotary movement at the lower end of the vertically movable carriage defined by the tubular members 27 and the cross-bars 28.

Mounted for vertical sliding movement through the opening 21 in the T 17 is a push rod 39 formed adjacent its upper end with a transverse opening for the reception of a cotter pin 40 against which a washer 41 seats. Surrounding the push rod 39 adjacent the washer 41 is a compression coil spring 42 the lower end of which bears against a washer 43 which seats on a gasket 44 which surrounds the rod and in turn rests upon a conical member 45 which is held against movement in one direction by means of a cotter key or pin 46 which extends transversely through the rod 39 as will be readily understood upon reference to Figure 4. The washer 43 and the gasket 44 are of a diameter to close the upper end of the nipple 15 when the valve is seated as illustrated in Figure 1. Formed on the rod 39 near its lower end is a cylindrical enlargement 47 and the rod is pierced transversely adjacent its lower end to receive a cotter pin 48 which serves as a stop against which a washer 49 bears. Seated on the washer 49 is a compression coil spring 50 the upper end of which bears against a washer 51 which is slidable on the rod 39 between the washer 49 and the enlargement 47, it being understood that the movement of the washer 51 under the influence of the spring 50 will be limited by the cylindrical enlargement or collar 47 previously described. The springs 42 and 50 serve as buffer springs while the main actuating spring for moving the valve to closed position surrounds the rod 39 and is designated 52. The upper end of this spring bears against the under-side of the T 17 while the lower end of the spring 52 rests upon a washer 53 held in spaced relation to the under-side of the T 17 by means of a cotter pin 54 which extends transversely through the rod as will be readily understood upon reference to Figures 1 and 5. It will thus be seen that the rod 39 will be urged downwardly so as to cause the gasket 44 to seat on the upper end of the nipple 15 and prevent the discharge of the liquid from the reservoir 10 until such time as the rod is moved upwardly against the compression of the spring 52.

In order to cause the rod 39 to move upwardly and lift the gasket 44 from its seat on the upper end of the nipple 15 a pair of spaced shafts 55 extend transversely of the device with their ends disposed in the guide channels between the bars 28 and the guide bars 32. The outer ends of the shafts 55 are journaled in angle brackets 56 which are pierced as at 57 to receive adjusting bolts 58. As shown in Figure 5 these adjusting bolts are provided with screw threads for the reception of adjusting nuts 59, the inner faces of which bear against compression coil springs 60. The opposite ends of said coil springs 60 bear against the outstanding legs of the brackets 56 yieldingly to urge the brackets and their respective shafts toward one another. Mounted for rotation on the shafts 55 are rollers 61 which as illustrated in Figures 4 and 5 are arranged on opposite sides of the rod 39 so that when the carriage defined by the sockets 27 and the bars 28 move upwardly the rollers 61 will engage the cylindrical portion 47 and cause the rod 39 to move upwardly against the compression of the spring 52, thus lifting the gasket 44 off of the upper end of the nipple 15 and permitting the contents of the reservoir 10 to flow out through the spray openings 19 to be discharged upon the surface of the applicator 34. After the initial opening movement, the rollers 61 will be forced outwardly against the compression of the springs 60 when the power of the spring 52 becomes sufficiently great and with the outward movement of the rollers 61 the rod 39 will be returned to its lowered position under the influence of the spring 52, thus causing the gasket 44 to seat again on the upper end of the nipple 15 and close the discharge passage therethrough. By adjusting the nuts 59 on their bolts 57 the force of the springs 60 may be regulated and consequently the length of time that the gasket 44 remains unseated with relation to the upper end of the nipple 15 may be varied to suit different conditions.

From the foregoing it will be seen that a simple and efficient applicator is provided so that as animals pass beneath the device and contact the rotary applicator 34 the liquid contained in the reservoirs 36 will be evenly distributed over the backs of the animals and at the same time the passage of the animals will cause the gasket 44 to unseat from its position on the upper end of the nipple 15 and allow a fresh charge of liquid to be deposited upon the applicator 34.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. In a device for applying liquid to livestock a tank adapted to be held in fixed suspension and having a bottom outlet, tubular guides carried by the tank, a liquid discharge valve in the bottom outlet, spray pipes connected to the liquid discharge valve, a carriage suspended from the tank for vertical movement with relation thereto, a liquid distributing roller at the lower end of the carriage upon which liquid from the spray pipes is adapted to impinge, a valve control rod depending from the liquid discharge valve, a spring encircling said rod yieldingly to hold said valve closed, a cylindrical enlargement on the rod near the upper end of the carriage and means on the carriage for engaging the enlargement on the rod to open the valve upon upward movement of the carriage.

2. In a device for applying liquid to livestock a tank adapted to be held in fixed suspension and having a bottom outlet, tubular guides carried by the tank, a liquid discharge valve in the bottom outlet, spray pipes connected to the liquid discharge valve, a carriage suspended from the tank for vertical movement with relation thereto, a liquid distributing roller at the lower end of the carriage upon which liquid from the spray pipes is adapted to impinge, a valve control rod depending from the liquid discharge valve, a spring encircling said rod yieldingly to hold said valve closed, a cylindrical enlargement on the rod near the upper end of the carriage and spring tensioned rollers on the carriage to engage the cylindrical enlargement on the rod and open the valve upon upward movement of the carriage.

WALTER L. WEAKLEND.

REFERENCES CITED

The following references are of record in the file of this patent:

UNITED STATES PATENTS

| Number | Name | Date |
|---|---|---|
| 1,156,974 | Howard | Oct. 12, 1915 |
| 1,212,415 | Starbuck | Jan. 16, 1917 |
| 1,237,784 | Hurff | Aug. 21, 1917 |